United States Patent
Ebihara (10) Patent No.: US 6,952,213 B2
(45) Date of Patent: Oct. 4, 2005

(54) DATA COMMUNICATION SYSTEM AND METHOD, COMPUTER PROGRAM, AND RECORDING MEDIUM

(75) Inventor: Hitoshi Ebihara, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 301 days.

(21) Appl. No.: 09/973,496

(22) Filed: Oct. 9, 2001

(65) Prior Publication Data

US 2002/0059302 A1 May 16, 2002

(30) Foreign Application Priority Data

Oct. 10, 2000 (JP) ........................................ 2000-309788
Oct. 2, 2001 (JP) ........................................ 2001-306961

(51) Int. Cl.[7] .............................. G06F 15/80; G09G 5/36
(52) U.S. Cl. ........................ 345/505; 345/559; 345/520; 345/531; 345/536
(58) Field of Search ................................. 345/501, 503, 345/520, 531, 536, 559, 505

(56) References Cited

U.S. PATENT DOCUMENTS

| 5,276,437 A | * | 1/1994 | Horvath et al. ............. 345/790 |
| 5,434,968 A | | 7/1995 | Kunii et al. |
| 5,557,734 A | | 9/1996 | Wilson |
| 5,655,112 A | * | 8/1997 | MacInnis .................... 345/501 |
| 5,956,046 A | * | 9/1999 | Kehlet et al. ............... 345/502 |
| 5,995,121 A | * | 11/1999 | Alcorn et al. ............... 345/520 |
| 6,088,043 A | * | 7/2000 | Kelleher et al. ............ 345/502 |
| 6,329,996 B1 | * | 12/2001 | Bowen et al. .............. 345/506 |
| 6,359,625 B1 | * | 3/2002 | Perego ....................... 345/555 |
| 6,501,441 B1 | * | 12/2002 | Ludtke et al. .............. 345/1.1 |
| 6,567,092 B1 | * | 5/2003 | Bowen ....................... 345/506 |
| 2003/0071816 A1 | * | 4/2003 | Langendorf ................ 345/519 |

FOREIGN PATENT DOCUMENTS

| JP | 1-180061 A | 7/1989 |
| JP | 5-189550 A | 7/1993 |

* cited by examiner

*Primary Examiner*—Ulka J. Chauhan
(74) *Attorney, Agent, or Firm*—Lerner, David, Littenberg, Krumholz & Mentlik, LLP (57) ABSTRACT

An apparatus comprises two or more image processing units and a main merger unit. Each image processing unit comprises four information processing units and a sub merger unit for merging data output from the four information processing units. The main merger unit merges data output from multiple sub merger units. Data output from the information processing units are stored in parallel in a register on a unit length basis for serial transmission. Auxiliary data is added for identifying data that have been altered or modified. The serial data, with the auxiliary data added thereto, are output to the main merger unit.

30 Claims, 7 Drawing Sheets

DATA COMMUNICATION SYSTEM AND METHOD, COMPUTER PROGRAM, AND RECORDING MEDIUM

CROSS-REFERENCE TO RELATED APPLICATIONS

This application claims priority from Japanese Patent Applications No. 2000-309788 filed on Oct. 10, 2000 and No. 2001-306961 filed on Oct. 2, 2001, the disclosures of which are hereby incorporated by reference herein.

BACKGROUND OF THE INVENTION

The present invention relates to data communication technologies for making two or more processors cooperate to enable more sophisticated information processing.

As processors such as computers grow more sophisticated, the use of such computers creates an expectation of more sophisticated information processing. As an example, expectations nowadays are running high for cooperative operation of two or more image processors to carry out processing for a large-screen motion picture display.

However, an increase in processing power of each individual processor of a multiprocessor system may not lead to effective use of the multiprocessor system unless the transmission of image data, synchronizing signals and other data is properly performed between the individual processors. When image processors cooperate to make a large-screen motion picture display, improper data communication therebetween runs a danger of reducing the number of image frames per second or may result in system downtime.

SUMMARY OF THE INVENTION

It is an object of the present invention to provide a data communication system that enables two or more processors to perform sophisticated processing.

It is another object of the present invention to provide a data communication method capable of making full use of the processing power of each processor when two or more processors are used for cooperative processing.

According to one aspect of the present invention, there is provided a data communication system comprising: a register for storing data which is exchanged between the register and a plurality of processing units for cooperative processing; and a control means which controls storing and reading of data into and from the register, wherein the control means stores data output from each of the plurality of processing units in parallel in the register, while it serially reads the data from the register on a unit length basis to form serial data, and when the serial data contain data that have been altered from previously formed serial data, the control means adds auxiliary data for identifying the altered data to a predetermined portion of the serial data and outputs to a subsequent-stage processing unit the serial data with the auxiliary data added thereto.

It may be arranged that the control means serially reads data from the register on the unit length basis to form the serial data at the time that at least one piece of the unit-length data stored in the register has been altered.

It may be arranged that the control means further stores data, to be output from the subsequent-stage processing unit to each of the processing units, in parallel in the register, and propagates copies of the stored parallel data over all the processing units at the same time.

According to another aspect of the present invention, there is provided a data communication system comprising: M first arbitrator means (where M is a natural number greater than one) each for arbitrating operations of corresponding N processing units (where N is a natural number greater than one), the N processing units cooperating to perform cooperative processing; and second arbitrator means for arbitrating operations of the M first arbitrator means, each of the M first arbitrator means including a first register capable of storing at least unit-length data output from the N processing units, and the second arbitrator means including a second register capable of storing at least data output from the M first arbitrator means, wherein data are stored in parallel in each of the registers and the data stored in each register are serially read out to form serial data, such that when the serial data contain data that have been altered from previously formed serial data, auxiliary data for identifying which data have been altered are added to a predetermined portion of the serial data read from at least the first register.

According to another aspect of the present invention, there is provided a data communication system comprising: M first arbitrator means (where M is a natural number greater than one) each for arbitrating operations of corresponding N processing units (where N is a natural number greater than one), the N processing units cooperating to perform cooperative processing; and second arbitrator means for arbitrating operations of the M first arbitrator means, each of the M first arbitrator means including a first register capable of storing unit-length data to be output to each of the N processing units, and the second arbitrator means including a second register capable of storing data of a predetermined size to be output to each of the M first arbitrator means, wherein copies of the data stored in the second register are propagated over all the processing units at the same time through the first registers.

It may be arranged that the processing units cooperate with one another to create frame image data with respect to divided images of a predetermined image.

It may be arranged that each of the processing units includes drawing processing means for drawing a predetermined image, a plurality of geometry processing means for performing geometry processing on the basis of predetermined image display instructions, and an image interface which intervenes between the drawing processing means and the geometry processing means, and the drawing processing means includes a buffer for storing, together with identification information, drawing contexts that are different in the contents from one another for each of the geometry processing means, and means for reading a specific drawing context from the buffer in response to input of a drawing instruction from the image interface, such that each of the geometry processing means performs geometry processing independently on the basis of the image display instructions and sends to the image interface an image transfer request containing the identification information of the drawing context acquired as a result of the geometry processing together with information indicative of priority given thereto, and the image interface receives the image transfer requests from the geometry processing means in priority order to sequentially input the drawing instructions to the drawing processing means.

According to another aspect of the present invention, there is provided a data communication system which controls storing and reading of data into and from a register provided on a computer network, the register provided for storing data to be exchanged between the register and a plurality of processing units for cooperative processing through the computer network, the system comprising: first means for storing data in parallel in the register, the data being output from one of the processing units to the other processing unit through the computer network; and second means which serially reads the data from the register on a unit length basis to form serial data, and which, when the serial data contain data that have been altered from previously formed serial data adds auxiliary data for identifying the altered data to a predetermined portion of the serial data and sends the serial data to the other processing unit through the computer network.

According to another aspect of the present invention, there is provided a data communication method for carrying out data communications between a plurality of processing units for cooperative processing and a subsequent-stage processing unit located at a subsequent stage of the processing units, the method comprising the steps of: storing unit-length data, output from the processing units, in parallel in a predetermined register; serially reading the unit-length data stored in the register to form serial data, and adding, when the serial data contain data that have been altered from previously formed serial data auxiliary data (for identifying the altered data) to a predetermined portion of the serial data to send the same to the subsequent-stage processing unit; and storing data, to be output from the subsequent-stage processing unit to the processing units, in parallel in the register, and propagating copies of the stored parallel data over all the processing units at the same time.

It may be arranged that the serial data are formed by serially reading the stored unit-length data at the time that at least one piece of the unit-length data stored in parallel in the register has been altered from the previously formed serial data.

It may be arranged that the processing units and the subsequent-stage processing unit are computers having communication capabilities, the register is provided in any one of the computers, and all the processing units are connected to a computer network so that data are exchanged through the computer network.

According to another aspect of the present invention, there is provided a computer program for causing a computer to operate as a data communication system, the computer having a function to control storing and reading of data into and from a register provided on a computer network, the register provided for storing data to be exchanged with other computers for cooperative processing through the computer network, the data communication system comprising: first means for storing data in parallel in the register, the data being output from one of the other computers to another of the other computers through the computer network; and second means which serially reads the data from the register on a unit length basis to form serial data, and which, when the serial data contain data that have been altered from previously formed serial data adds auxiliary data for identifying the altered data to a predetermined portion of the serial data and sends the serial data to the other computer through the computer network.

It may be arranged that the foregoing computer program is recorded in a computer-readable recording medium.

DESCRIPTION OF THE PREFERRED EMBODIMENTS

First, an embodiment will be described in which a data communication system according to the present invention is applied to an integrated image processing apparatus provided with two or more image processing units that cooperate to carry out cooperative processing.

Figure 1:
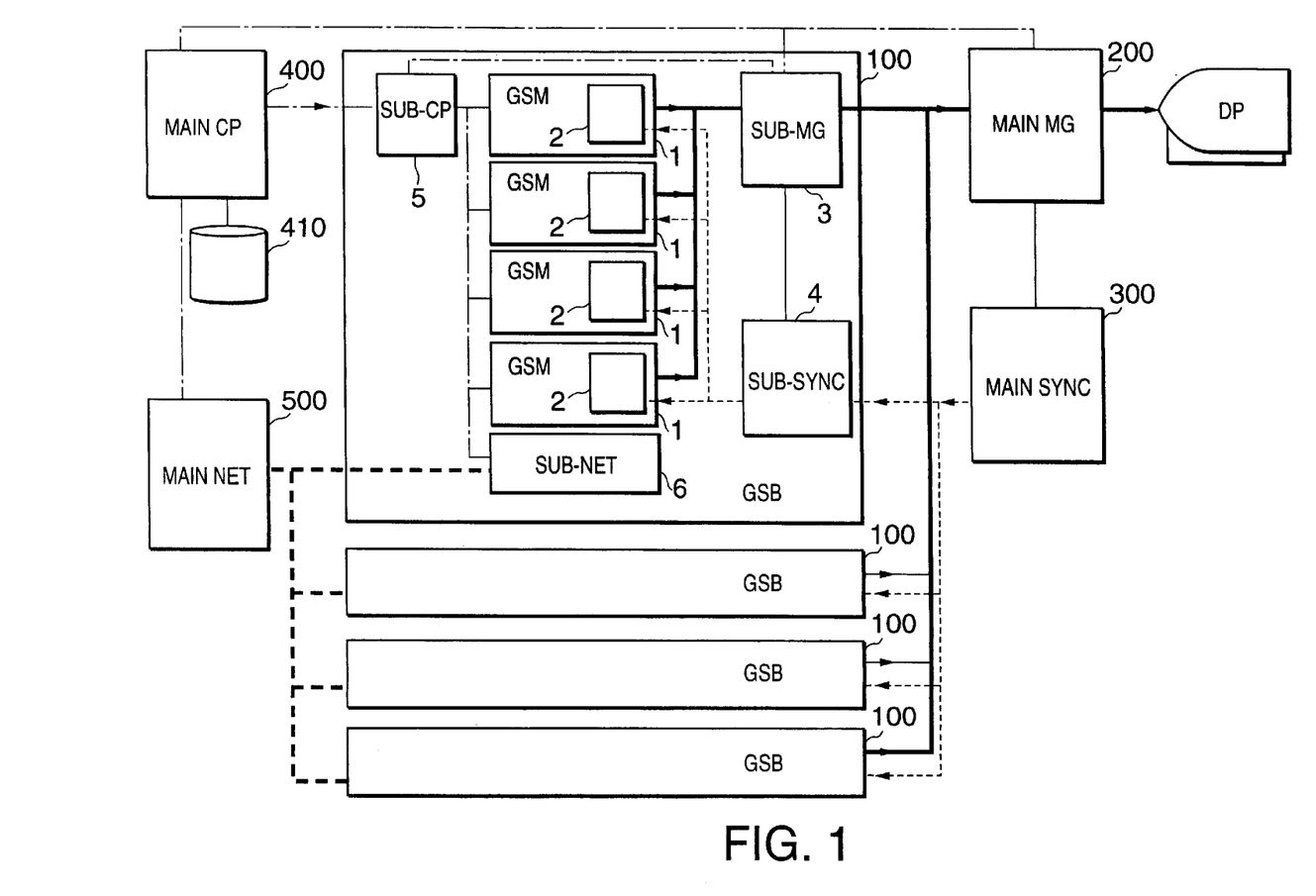
FIG. 1 is a block diagram of an integrated image processing apparatus according to an embodiment of the present invention.

FIG. 1 is a block diagram showing the general structure of the integrated image processing apparatus in this embodiment. The integrated image processing apparatus includes four image processing units (hereinafter called "GSB") 100, an integrator or merger unit (hereinafter called "main MG") 200, a synchronizing circuit (hereinafter called "main SYNC") 300, a control unit ((hereinafter called "main CP") 400, and a network control circuit (hereinafter called "main NET") 500. The main MG 200 is located at a subsequent stage of each GSB 100 so that output data from the respective GSBs 100 will be merged. The main SYNC 300 supplies each GSB 100 with a synchronizing signal (V-SYNC) and other operating data. The main CP 400 manages and controls image processing and communication procedures in the entire system. The main NET 500 makes all the GSBs 100 cooperate with one another.

A display unit DP is connected to the output side of the main MG 200 so that the results of image processing in the integrated image processing apparatus will be displayed thereon. The timing of sending various data from the main SYNC 300 to each GSM 1 is controlled by the main MG 200 (described later). The main MG 200, an external storage 410 and the main NET 500 are connected to the main CP 400.

Each GSB 100, the main MG 200, the main SYNC 300, the main CP 400 and the main NET 500 each comprise an electronic circuit including semiconductor devices such as a processor and a memory or a combination of electronic circuits.

Each GSB 100 includes four information processing units (hereinafter called "GSM") 1, a merger unit (hereinafter called "sub-MG") 3, a synchronizing circuit (hereinafter called "sub-SYNC") 4, a control unit (hereinafter called "sub-CP") 5, and a network control circuit (hereinafter called "sub-NET") 6. Each GSM 1 creates frame image data corresponding to an image data string input thereto. The sub-MG 3 merges frame image data output from the GSMs 1 into one frame data to output the same to subsequent-stage processing. The sub-SYNC 4 supplies each GSM 1 with a synchronizing signal (V-SYNC) and other operating data. The sub-CP 5 manages and controls image processing and communication procedures in each GSM 1. The sub-NET 6 makes all the GSMs 1 in both the same GSB and other GSBs cooperate with one another. The frame image data enable the display unit DP to display an image on the screen thereof. The frame image data comprises RGB coordinate values in a frame, an α value indicative of the transparency of the frame, and a Z value indicative of which layer the frame corresponds to when two or more frames are merged.

Each GSM 1 is equipped with a synchronizing circuit (hereinafter called "SYNC-GSM") 2 which supplies the internal circuitry with a synchronizing signal as an internal operation timing signal.

The sub-MG 3 and the main MG 200 are each equipped with a data register for temporarily storing frame image data to be output.

The sub-CP 5 is equipped with a demultiplexer (not shown) for dividing the input image data string into four parts and distributing to each of the four GSMs 1 a quarter of the image data string. The latter is related to a moving image. The distribution may take various forms depending on the application software run on the apparatus. For example, the whole area of an image to be finally displayed may be divided into four parts, or into four image data strings, each of which is to display a corresponding layer to be superimposed one upon another for the final image. Alternatively, image data that has combined four frames into one may be divided into four parts.

The sub-Net 6 is a circuit for passing part or all of the image data string between its own GSB and another GSB. The image data string is passed mainly to balance the image processing load among the GSBs.

It should be noted that merging performed by the sub-MG 3 is carried out in synchronization with an absolute time base that controls the operation of all the GSBs. In other words, the sub-MG 3 merges two or more pieces of applied frame image data in synchronization with the absolute time base to generate one frame of image data.

Each GSB 100 is supplied with an image data string (from the main CP 400 through the sub-CP 5) and a trigger (from the main SYNC 300 through the sub-SYNC 4) as a signal for indicating the start of image processing. The trigger causes all the GSMs 1 to start image processing for the image data string applied to the respective GSBs.

The SYNC-GSM 2, the sub-SYNC 4 and the main SYNC 300 each incorporate a data register and two or more counters therein. Each counter includes a register for holding its count value, so that an interrupt occurs when the count value reaches a predetermined value. Of these counters, a first counter determines the number of synchronizing signals for making two or more GSMs 1 operate in synchronization with each other. The first counter is incremented at the falling edge of an input synchronizing signal ("V-SYNC"). Although V-SYNC is asynchronous to the bus clock, V-SYNC is sampled by a first clock, and the increment timing may vary by one clock between GSMs. In particular, the count value is reset by a reset signal from the main CP 400. However, since the reset signal is coupled with an asynchronous clear terminal of each counter module, a fluctuation of one clock may occur between GSMs as viewed from the first clock as the reference.

The second counter is an up counter for measuring a precise time interval between V-SYNCs, and is forcefully reset to zero each time it detects the falling edge of V-SYNC.

Each GSM 1 creates frame image data corresponding to an input image data string at the time at which the V-SYNC is applied to the SYNC-GSM 2. Each data piece of the image data string is read and supplied from the external storage 410 connected to the main CP 400, and processed in a predetermined manner to form the frame image data.

In the embodiment, the GSMs 1 serve as the nerve center of the integrated image processing apparatus. The functional structure of each GSM 1 according to the embodiment is shown in detail in FIG. 2.

Figure 2:
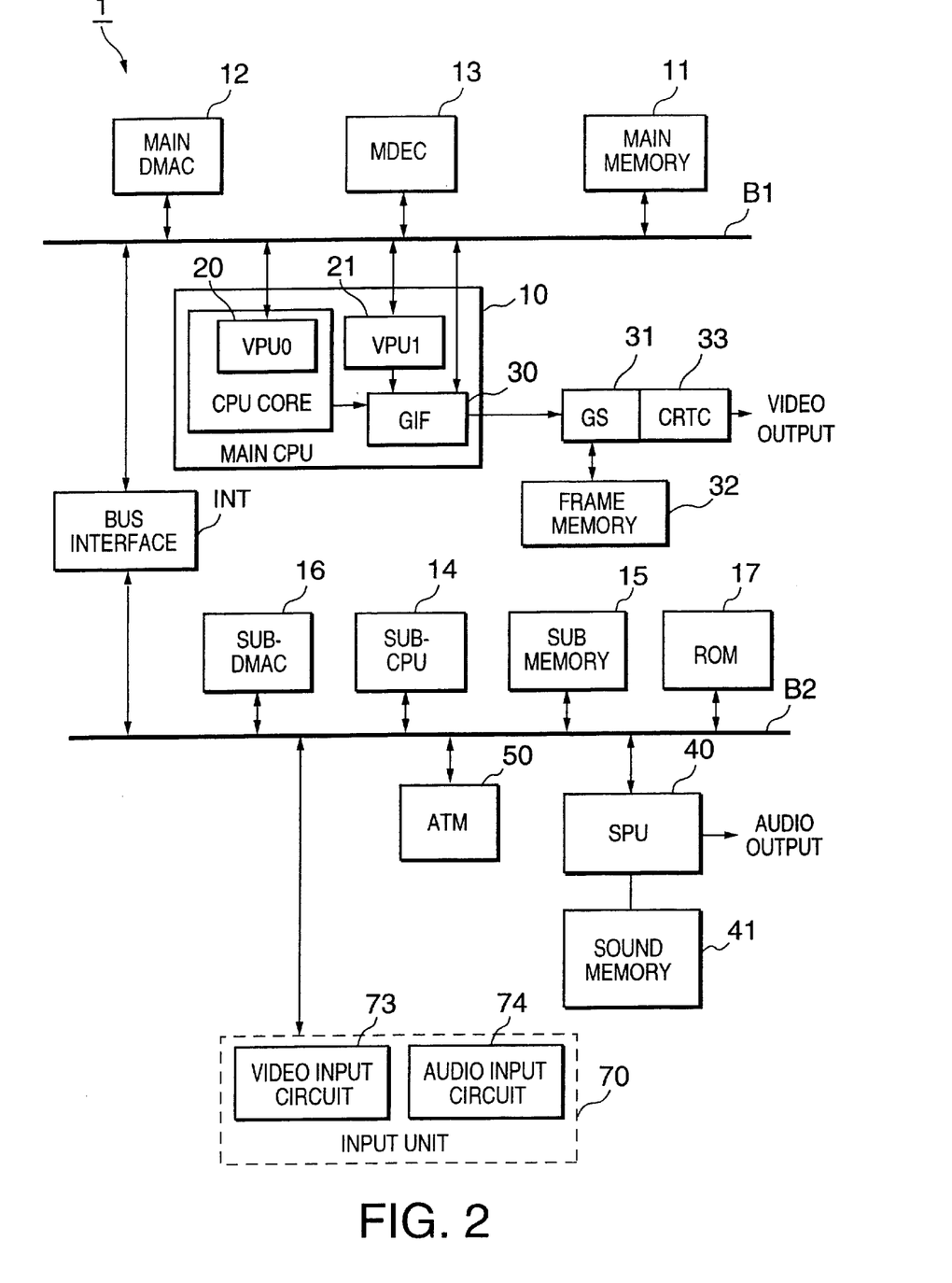
FIG. 2 is a functional block diagram of an information processing unit (GSM).

As shown in FIG. 2, the GSM 1 has two buses, a main bus B1 and a sub-bus B2. These buses B1 and B2 are connected to and disconnected from each other through a bus interface INT. The main bus B1 is connected with a main CPU (Central Processing Unit) 10 and a main memory 11. The main CPU 10 includes a microprocessor and a VPU0 20 (where the VPU means Vector Processing unit and the VPU0 is called the "first VPU" below) The main memory 11 mainly comprises RAM (Random Access Memory). The main bus B1 is also connected with a main DMAC (Direct Memory Access Controller) 12, an MPEG (Motion Picture Experts Group) decoder (MDEC) 13, a VPU1 (hereinafter called the "second VPU") 21, and a GIF (Graphical Synthesizer Interface) 30 which serves as an arbiter for arbitrating between the first VPU 20 and the second VPU 21. Further, the main bus B1 is connected to drawing processing means ("GS") 31 through the GIF 30. The GS 31 is connected to a CRTC (CRT Controller) 33 for creating frame image data (video output). The CRTC 33 outputs the frame image data to the sub-MG 3.

Upon activation, the main CPU 10 reads a bootstrap program from a ROM 17 on the sub-bus B2 through the bus interface INT, and runs the bootstrap program to start an operating system. The main CPU 10 also cooperates with the first VPU 20 to perform geometry processing for 3D object data composed of basic graphics or geometries (polygons) such as to process coordinate values of the apexes (representative points) of the polygons. A high-speed memory, called an SPR (Scratch Pad RAM) (not shown), is provided in the main CPU 10 for temporarily storing processing results obtained from the cooperative operation of the main CPU 10 with the first VPU 20.

The first VPU 20 includes two or more operators for performing floating-point operations in parallel. Thus the main CPU 10 and the first VPU 20 cooperate to perform arithmetic processing that requires detailed operations on a polygon basis in the geometry processing. As a result of the arithmetic processing, a display list is created including as its contents polygon definition information such as a series of apex coordinates and shading mode information.

The polygon definition information comprises drawing area setting information and polygon information.

The drawing area setting information includes offset coordinates to the drawing area in a frame buffer address, and coordinate data on a drawing clipping area for canceling the drawing operation in the case where the coordinates of a polygon are outside the drawing area.

The polygon information includes polygon attribute information and apex information. The polygon attribute information specifies a shading mode, an α blending mode, a texture mapping mode, and so on. The apex information includes coordinates in an apex drawing area, coordinates in an apex texture area, apex colors, and so on.

The second VPU 21 is similar to the first VPU 20, that is, it includes two or more operators for performing floating-point operations in parallel. Further the second VPU 21 also creates a display list as described above.

The first VPU 20 and the second VPU 21, serve as geometry engines for sharing the arithmetic processing load. In general, the first VPU 20 is assigned processing necessary for complicated computations on something in action such as a character in motion (irregular or free-format geometry processing). On the other hand, the second VPU 21 is assigned processing of objects which are simple but need a large number of polygons such as background buildings (regular or formatted geometry processing). Further, the first VPU 20 performs macro operations in synchronization with a video rate, while the second VPU 21 operates in synchronization with the GS 31. To synchronize the second VPU 21 with the GS 31, the second VPU 21 is directly coupled to the GS 31. On the other hand, the first VPU 20 is closely coupled to a microprocessor in the main CPU 10 so that complicated processing can easily be programmed.

The display lists created by the first VPU 20 and the second VPU 21 are transferred to the GS 31 through the GIF 30, respectively.

The GIF 30 arbitrates the collision between the display lists created in the first VPU 20 and the second VPU 21 during the transfer operation. In the embodiment, the GIF 30 has an additional function of arranging these display lists in a priority order and transferring them to the GS 31 sequentially in order of precedence. Information indicative of the priority of each display list is generally described in a tag field of the display list when the VPU 20 or 21 creates the display list, but the priority may be judged independently by the GIF 30.

The GS 31 holds drawing context information, so that it reads a corresponding drawing context on the basis of identification information on the image context contained in the display list sent from the GIF 30. The GS 31 then uses this drawing context to perform rendering for drawing a polygon on a frame memory 32. Since the frame memory 32 can also be used as a texture memory, any pixel image stored in this frame buffer can be pasted on the polygon to be drawn.

The main DMAC 12 controls not only DMA transfers to each circuit connected to the main bus B1, but also controls DMA transfers to each circuit connected to the sub-bus B2 according to the state of the bus interface INT.

The MDEC 13 operates in parallel with the main CPU 10 to decompress data compressed, for example, in the MPEG (Motion Picture Experts Group) or JPEG (Joint Photographic Experts Group) format.

The sub-bus B2 is connected with a sub-CPU 14 including a microprocessor, a sub-memory 15 mainly comprising a RAM, a sub-DMAC 16, and a ROM 17 in which programs such as an operating system are stored. The sub-bus B2 is also connected with a sound processing unit (SPU) 40, which reads tone data accumulated in a sound memory 41 to provide the same as an audio output, a communication control unit (ATM) 50 for receiving and sending data, and an input unit 70.

The SYNC-GSM 2 is connected to the sub-bus B2, and the sub-NET 6 is connected to the ATM 50.

The input unit 70 includes a video input circuit 73 for taking in image data from the outside, and an audio input circuit 74 for taking in audio data from the outside.

In the embodiment, an image data string is input from the sub-CP 5 (distributed from the main CP 400) through the video input circuit 73. The sub-CPU 14 controls various operations according to the programs stored in the ROM 17. The sub-DMAC 16 controls operations such as DMA transfers to each circuit connected to the sub-bus B2 only when the bus interface INT disconnects the main bus B1 from the sub-bus B2.

Next, a data communication system included in the integrated image processing apparatus will be described.

First the concept of data communication will be described with reference to FIGS. 3 to 5.

Figure 3:
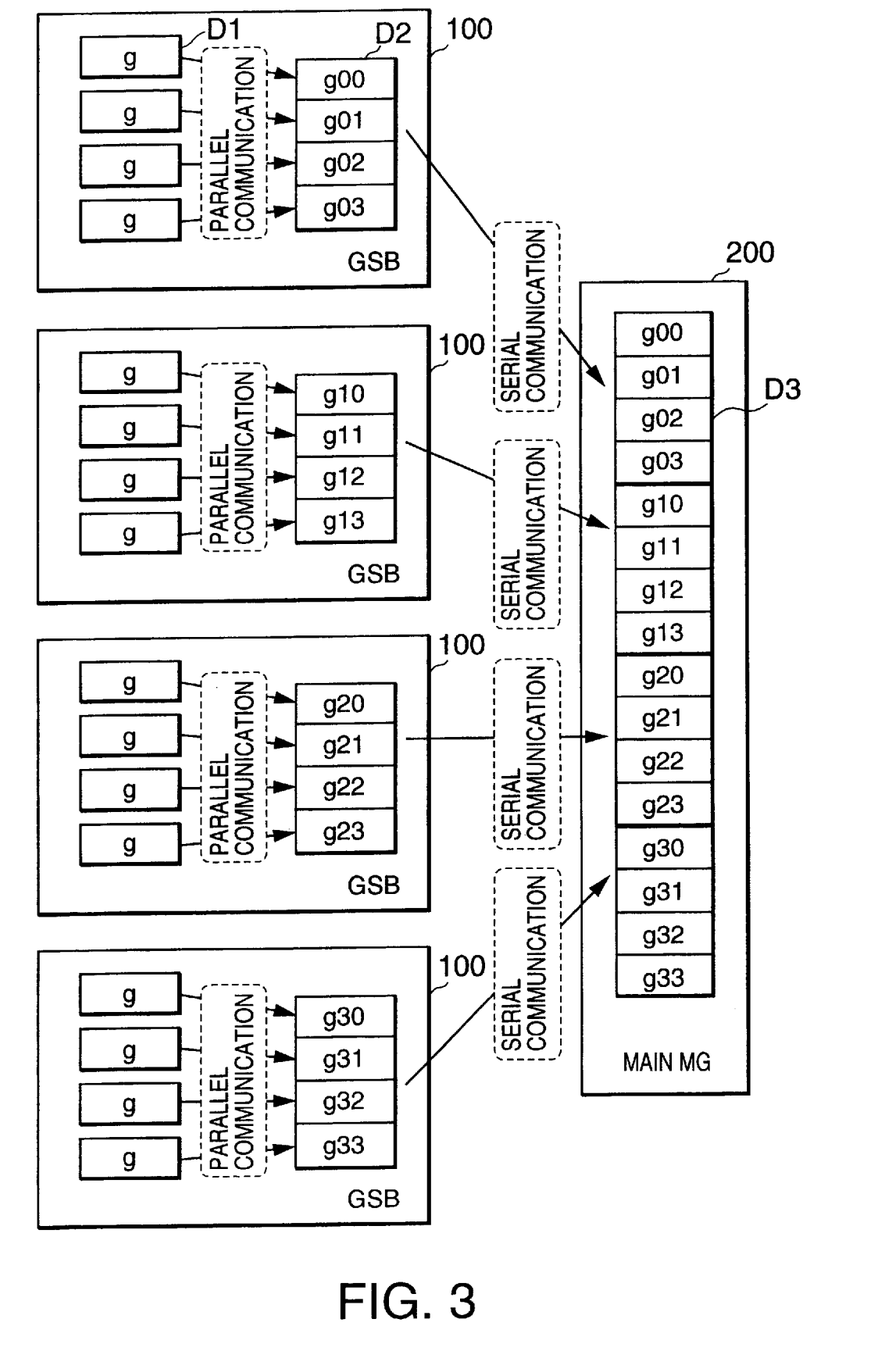
FIG. 3 is a conceptual diagram showing a form of data communication between image processing units (GSBs) and a integrator, or merger, (main MG).
Figure 4:
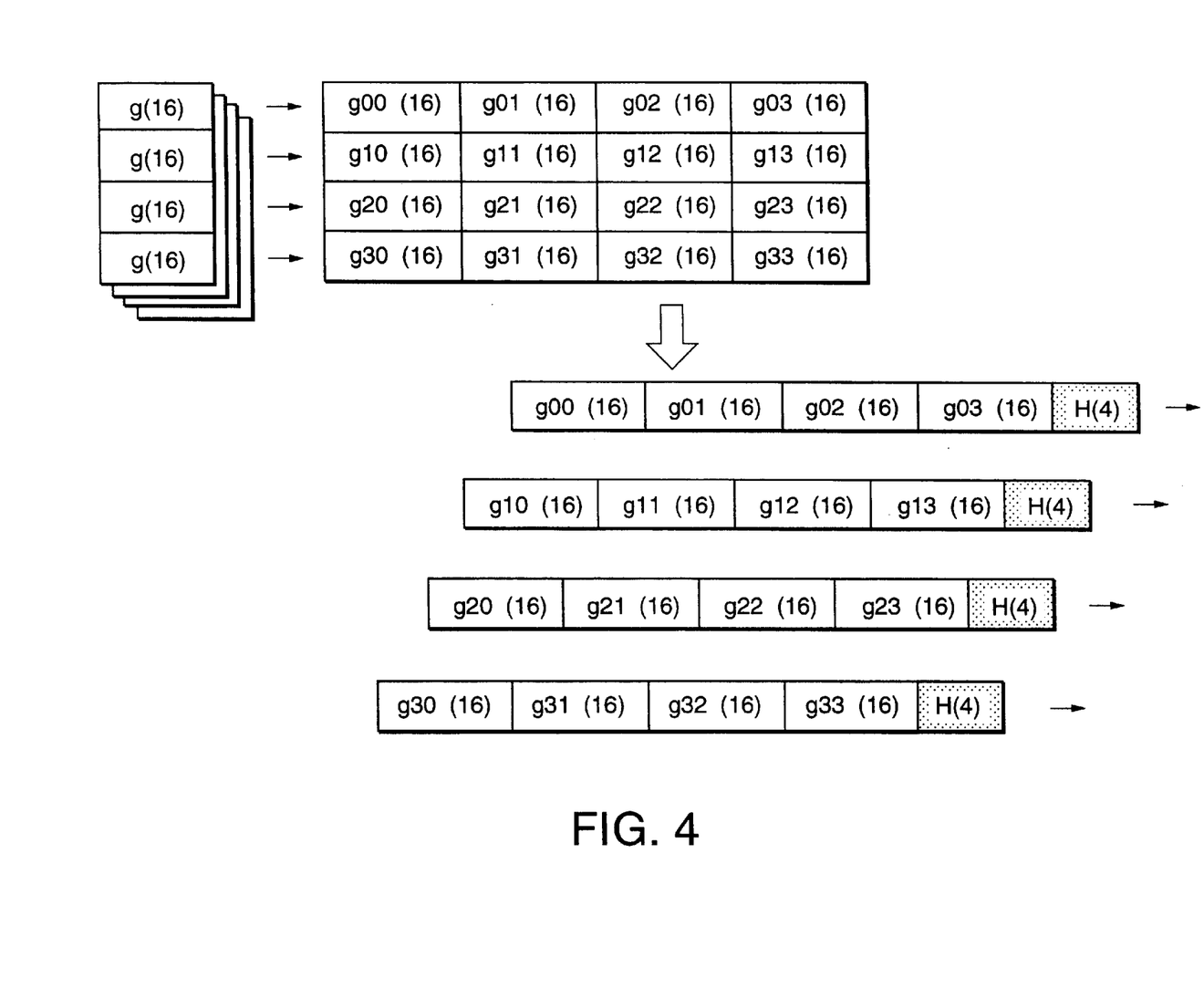
FIG. 4 is a diagram for explaining the form of the data communication.
Figure 5:
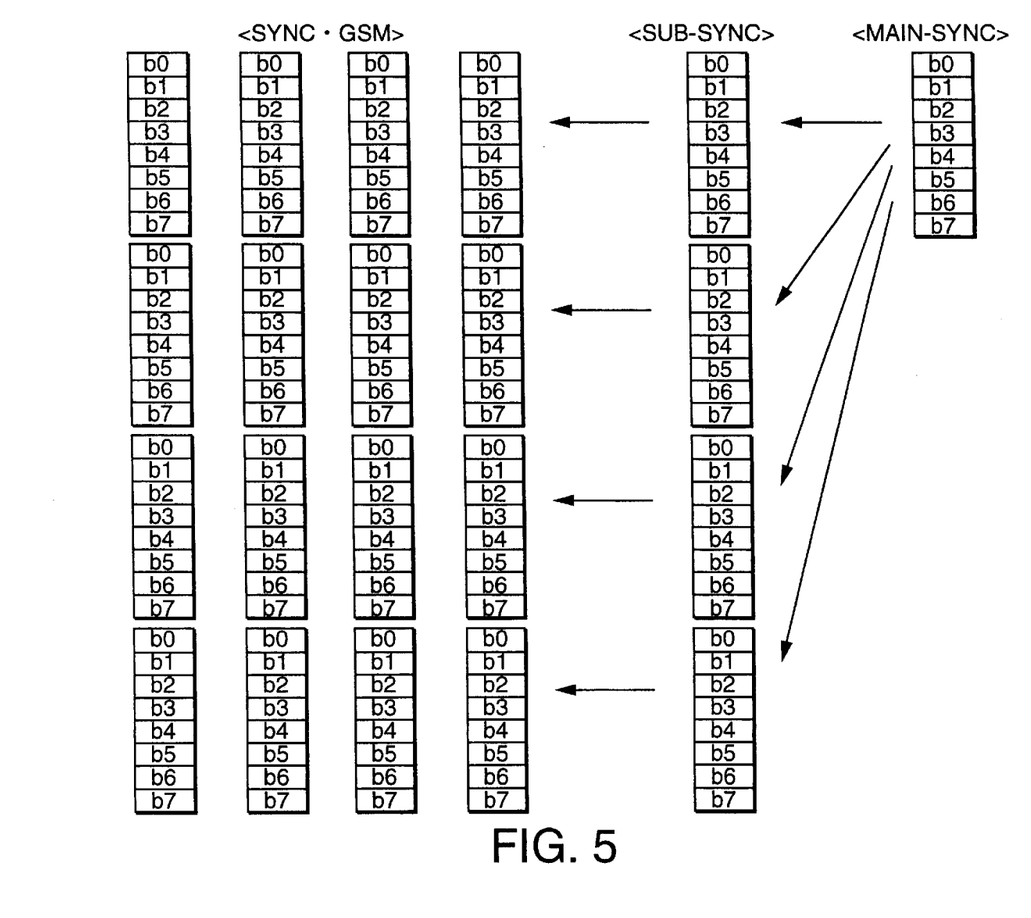
FIG. 5 is a diagram illustrating a case where data such as a V-SYNC and a trigger are distributed from a main SYNC to each GSM.

FIG. 3 illustrates data communications from the GSBs 100 (GSMs 1) toward the main MG 200, and FIG. 4 is a diagram illustrating details of the data communications. FIG. 5 shows a form of data communication from the main SYNC 300 toward the GSM 1. The following illustrates a case where frame image data are sent from the GSB 100 to the main MG 200, and the V-SYNC is sent from the main SYNC 300 to each GSM 1.

As shown in FIG. 3, parallel communications occur inside each GSB 100. In other words, a predetermined size (e.g., 16 bits) of frame image data g (16) are created inside each of the four GSMs 1, and sequentially stored in an internal register D1 of each GSM 1. The frame image data g (16) are transmitted in parallel to the sub-MG 3. The sub-MG 3 receives and stores the frame image data g (16) in its internal register D2. This parallel communication allows the sub-MG 3 side to receive the frame image data quickly even if the number of GSMs 1 increases. The size of four pieces of frame image data g (16) stored in the internal register D2 of the sub-MG 3 is designated herein as the "unit data length".

Frame image data g00 (16) to g03 (16) in the first GSB, g10 (16) to g13 (16) in the second GSB, g20 (16) to g23 (16) in the third GSB, and g30 (16) to g33 (16) in the fourth GSB each form a unit data length.

The frame image data are serially transmitted from each GSB 100 to the main MG 200, and stored in an internal register D3 of the main MG 200. In other words, as shown in FIG. 3, the frame image data are serially read from the internal register D2 of the sub-MG 3 of each GSB 100 on a unit data length basis to form the serial data. Then the serial data are sequentially stored in the internal register D3 of the main MG 200. Thus the capacity of the communication path between the GSB 100 and the main MG 200 can be saved.

With respect to the serial communication, auxiliary data is created if any data have been altered or modified from data previously stored in the internal register D3. The auxiliary data provides information on the position and type of data, etc., for identifying the modified data. The auxiliary data are added to a predetermined portion of the serial data before being output to the main MG 200. In the example of FIG. 4, four-bit auxiliary data H (4) are added to the leading header portion of each of the serial data.

The frame image data stored in the internal register D2 are read out at the time at least one piece of the frame image data has been altered or modified, which prevents wasteful data communications.

The V-SYNC is distributed from the main SYNC 300 to each GSM so that the GSMs 1 will be synchronized with one another for image processing. FIG. 5 shows this synchronized state. Each GSM 1 has its own path upon which the address to the GSM 1 can be specified. Here, each sub-SYNC 4 is used as a data mediator alone. The main SYNC 300 holds in its internal register parallel data to be distributed (V-SYNC), makes the sub-SYNCs 4 copy the parallel data in their internal registers at the same time, and hence all the GSMs 1 in the respective GSB 100 copy the same parallel data at the same time. Thus the copies of the parallel data are propagated over all the GSMs 1.

In the above-mentioned data communication, the internal register D1 of each GSM 1 in which the frame image data are stored is a frame memory 32 or the like, while the register for copying the V-SYNC thereinto is an internal register provided with the above-mentioned first counter. The main CPU 10 controls recording of data into the internal register D1.

Each sub-MG 3 (that is kept under the constant watch of the main CP 400) carries out reading, in parallel, of the frame image data from the internal register D1 of each GSM 1, creation of auxiliary data and performs serial transmission to the main MG 200. The sub-MG 3 also serves as first arbiter means for arbitrating the operation of each GSM 1.

The internal register D2 for temporarily recording the frame image data sent from each GSM 1 is provided inside the sub-MG 3. The capacity of the internal register D2 needs to be high enough to store at least the data output from the four GSMs at the same time.

The sub-CP 5 controls recording of the frame image data into the internal register D2 of the sub-MG 3. On the other hand, the main MG 200 (that is kept under the constant watch of the main CP 400) reads data from the internal register D2 of the sub-MG 3 included in each GSB 100. The main MG 200 also serves as second arbiter means for arbitrating the operation of each GSB 100.

The internal register D3 for temporarily recording the frame image data sent from each GSB 100 is provided inside the main MG 200. The capacity of the internal register D3 needs to be high enough to store at least the data output from all the GSBs 100 at the same time.

Figure 6:
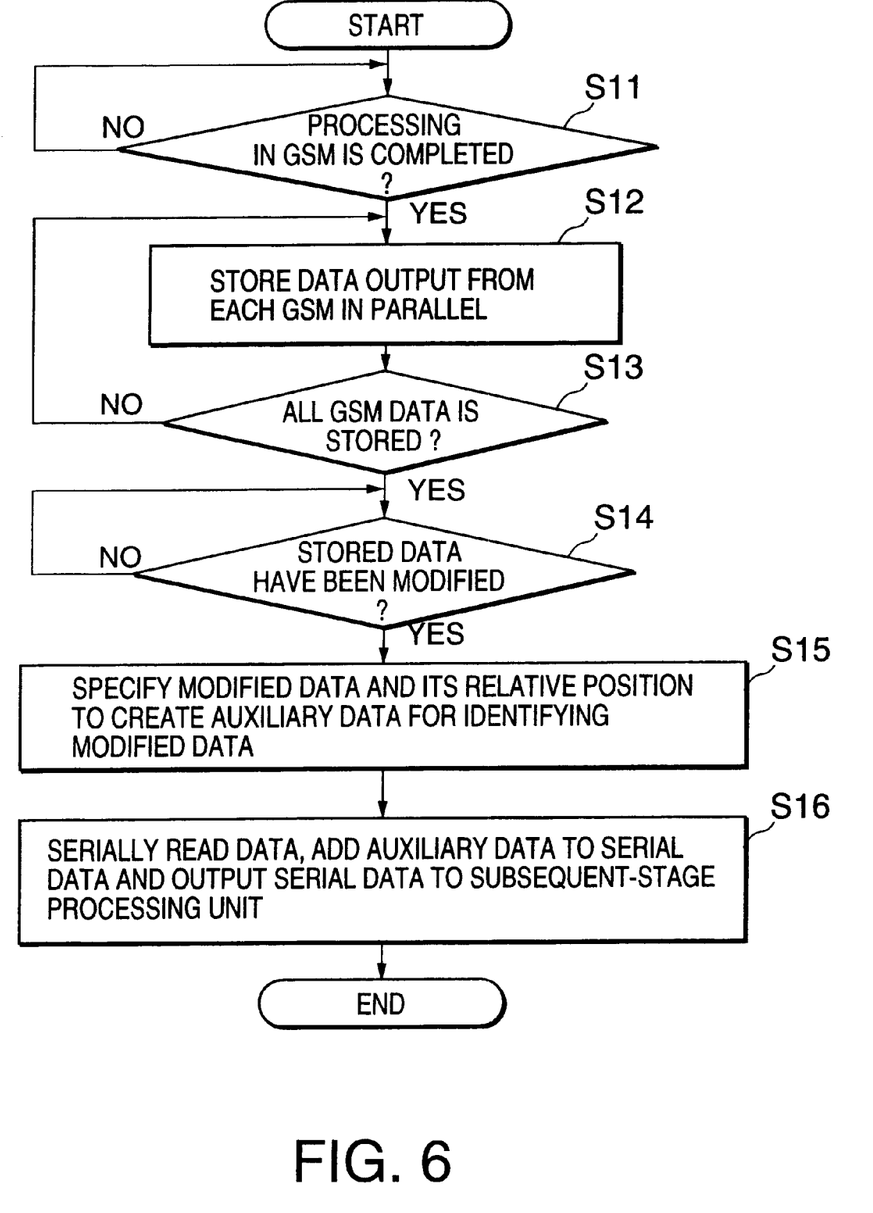
FIG. 6 is a flowchart for explaining steps in a case where frame image data are sent from the GSM to the main MG.
Figure 7:
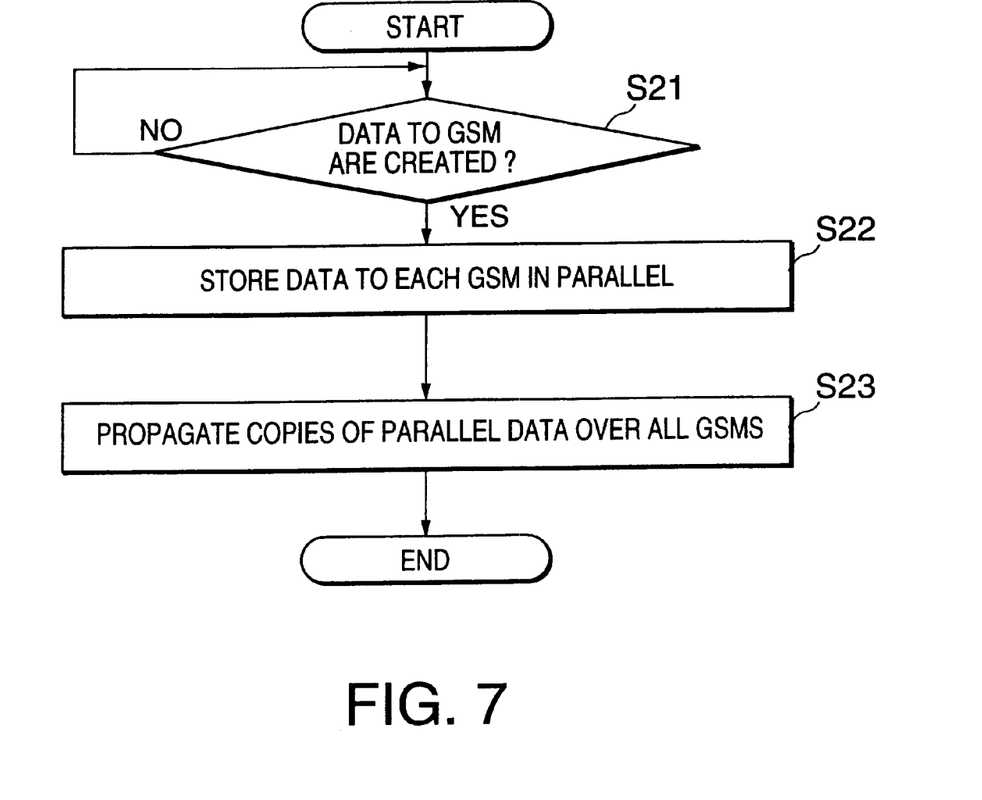
FIG. 7 is a flowchart for explaining steps in a case where the main SYNC distributes data such as the V-SYNC to the GSM.

Turning now to FIGS. 6 and 7, a data communication process executed in the integrated image processing apparatus will be described.

FIG. 6 is a flowchart showing steps for sending frame image data created in a GSM 1 to the main MG 200.

Upon completion of processing within the GSMs, data output from each GSM 1 are stored in parallel in the sub-MG 3 inside each GSB 100 (step S11 to step S12 if "Yes" in step S11). Once the parallel data from all the GSMs 1 are completely stored (step S13 to S14 if "Yes" in step S13), if any data have been altered or modified, auxiliary data for identifying the modified data are created (step S14 to step S15 if "Yes" in step S14). The stored data are serially read out to form serial data. The serial data is then output serially to the main MG 200 with the auxiliary data added to the leading header portion of the serial data (step S16). In this embodiment, the auxiliary data represents a position of the modified data in the serial data, and thus is placed at the leading header portion of the serial data as shown in FIG. 4.

The above-mentioned operational steps are performed for all the GSBs 100. As a result, frame image data processed in all the GSMs 1 of all the GSBs 100 are stored in parallel in the main MG 200, which makes it possible to display the stored frame image data on the display unit DP at any time. The frame image data stored in the main MG are serially output to the display unit DP.

FIG. 7 is a flowchart showing steps for distributing data such as the V-SYNC from main SYNC 300 to each GSM 1.

When data addressed to GSMs occur, parallel data addressed to each GSM are stored in the internal register of the main SYNC 300 (step S21 to step S22 if "Yes" in step S21). The stored parallel data are copied and then propagated over all the internal registers of the four sub-SYNCs 4 at the same time, and over all the four GSMs 1 in each GSB at the same time (step S23). Thus the copies of the same data can be propagated over all the 16 GSMs at the same time without any inconsistency, which is effective for cooperative processing of these GSMs 1.

The cooperative processing of two or more GSMs 1 is thus coordinated, so that when a large-screen image is to be displayed, the processing for making the display can be smoothly performed, thus obtaining a high-quality image on the large screen.

It should be noted that when the GSMs 1 need to cooperate so as to perform drawing processing, the GSMs are coordinated by giving instructions to the sub-NET 6 of each GSB 100 via the main NET 500 so that no inconsistency will occur.

As discussed above and according to the embodiment, the integrated image processing apparatus is such that frame image data output from two or more GSMs 1 are stored in parallel. The stored frame image data are transmitted in serial form to the main MG 200. Auxiliary data are added to the leading header portion of the serial data for identifying modified data in the serial data. The above-mentioned configuration has the advantage of immediately identifying modified data while saving the capacity of the communication path required for the data communication.

Further, data (V-SYNC) for each internal register are copied and the copies of the this data are propagated from the main SYNC 300 over all the GSMs 1 at the same time. This makes it possible for two or more GSMs 1 to operate at the same time without any inconsistency.

The frame image data created in the four GSBs 100 are output with reference to the absolute time base of each GSB. However, since the absolute time base is uniquely assigned to each GSB, a slight output-to-output variation would result. This means that the absolute time base of each GSB 100 corresponds to a relative time base as seen from the entire integrated image processing apparatus. The use of the main SYNC 300 to carry out the above-mentioned data communications enables the above-mentioned relative time base to accord with the time base unique to the integrated image processing apparatus. Thus the data merged in the main MG 200 are controlled by the absolute time base of the integrated image processing apparatus.

If frame image data from a GSB 100 become chipped, the main MG 200 merges all the frame image data along the absolute time base without compensation for the missing image signal. The frame image data thus created are output and then displayed on the display unit DP. Since two or more GSMs 1 are used to create an image, image processing can be smoothly performed even if a large-screen display of the image is to be made, thereby obtaining a high-quality image on the large screen.

Further, the main CP 400 and the sub-CP 5, and the main MG 200 and the sub-MG 3 can be configured in the same manner. This makes it possible to perform sophisticated image processing, for example, for obtaining a high-quality, large-screen image using a simple design technique. The number of GSMs 1 in each GSB 100 or the number of GSBs 100 can be arbitrarily decided. Variations in the number may be decided according to the tradeoff between quality and cost, which can reduce its design limits. For example, if the number of GSMs 1 increases, the cost will rise but the image quality obtained will become higher.

Although the inventive concept was described in the content of data communication technology for image processing, the inventive concept can also be applied to information processing of other types such as sound or audio processing. For example, more delicate, high-quality sound such as in an orchestra concert can be reproduced. In this case, two or more pieces of data for generating sound are individually processed in each GSM 1. Further, a form of complex processing can be considered in which image processing is linked with sound generation. As shown in FIG. 2, the use of GSMs 1 according to the embodiment enables such complex processing. When the information processing involves sound generation, sound data obtained in the processing become signals for outputting tones from a predetermined speaker or speakers. Then the sound data are output in synchronization with the above-mentioned frame image data by means of the above-mentioned sub-MGs 3 and the main MG 200. It should be noted that the sound data to each GSM 1 are input from an audio input circuit 74 and output from an SPU 40 as shown in FIG. 2.

While the first embodiment described an exemplary data communication system included within an integrated image processing apparatus the inventive concept can also be implemented in a network type data communication system.

For example, the inventive concept can be implemented in the following network type data communication system. In this case, two or more information processing terminals installed at completely different locations are connected through a computer network such as the Internet. The information processing terminals can operate as the processing units, the arbitrator means, the register and the control means according to the present invention while inter-exchanging data among these information terminals through the computer network.

Some of the information processing terminals serve as the GSBs 100 described in the first embodiment. The other information processing terminals share the following functions: the main MG 200 for merging output data of the information processing terminals serving as the GSBs 100, the main SYNC 300 for supplying the synchronizing signal (V-SINC) and other operating data to each GSM, the main CP 400 for managing and controlling image processing and communication procedures, and the main NET 500 for making all the GSBs 100 cooperate with one another.

The output side of the information processing terminal serving as the main MG 200 is connected to a display unit. The information processing terminal serving as the main MG 200 controls the timing of sending various data from the main SYNC 300 to each GSB 100. On the other hand, the information processing terminal serving as the main CP 400 is connected to the information processing terminals serving as the main MG 200, the external storage and the main NET, respectively.

The network type data communication system thus configured operates in the same manner as that in the first embodiment.

Similarly, the inventive concept can be implemented in a data communication system which controls storing and reading of data into and from a register provided on a computer network so that the data to be exchanged between the above-mentioned GSMs for cooperative processing through the computer network will be stored in the register.

Such a data communication system may include a server coupled to the computer network and external storage accessible to the server. In this case, the server (and a CPU incorporated in the server) reads and executes a computer program recorded on a predetermined recording medium to form not only a register for data communication in the external storage, but also to function as a main control unit.

The main control unit includes two functional modules.

The first functional module has the function of acquiring data to be output from any one of the GSMs to the other GSMs (the other information processing terminals) through the computer network and storing the same in parallel in the above-mentioned register.

The second functional module has the function of serially reading data from the above-mentioned register on a unit length basis to form serial data. When the serial data includes data that have been altered or modified from the serial data previously formed, the second functional module adds auxiliary data for identifying which data have been altered or modified to a predetermined portion of the serial data. Then the second functional module sends the serial data, with the auxiliary data added thereto, to the other information processing terminals as the other GSMs through the computer network.

The data communication system thus configured operates in the same manner as those in the first and second embodiments, except that the control unit independently controls storing and reading of data into and from the register, which can also avoid inconsistencies in cooperative processing of two or more GSMs.

As described above and in accordance with the inventive concept, processing can be performed without any inconsistency even if two or more processing units are used. If the processing units are image processing units, two or more frames of image data can be output at the same time, which makes it possible to obtain a high-quality image on a large screen.

What is claimed is:

1. A data communication system comprising:

a register for storing data which are exchanged between the register and a plurality of processing units for cooperative processing; and a control means for controlling the register for (a) storing data output from each of the plurality of processing units in parallel in the register, and (b) reading the data from the register to form new serial data, wherein the control means adds auxiliary data to a predetermined portion of the new serial data when the new serial data include data that have been altered from serial data previously formed, the auxiliary data identifying the altered data, and wherein the control means provides the new serial data to a subsequent-stage processing unit with the auxiliary data added thereto.

2. The system according to claim 1, wherein the control means forms the new serial data at a time that the data stored in the register have been altered.

3. The system according to claim 1, wherein the control means further stores data received from the subsequent-stage processing unit in parallel in a second register, and propagates copies of the parallel data stored therein over all the processing units at the same time.

4. The system according to claim 1, wherein the processing units cooperate with one another to create frame image data with respect to divided images of a predetermined image.

5. The system according to claim 1, wherein each of the processing units includes drawing processing means for drawing a predetermined image, a plurality of geometry processing means for independently performing geometry processing on the basis of predetermined image display instructions, and an image interface which intervenes between the drawing processing means and the geometry processing means, and wherein the drawing processing means includes a buffer for storing identification information together with a drawing context for each of the geometry processing means, and means for reading a specific drawing context from the buffer in response to a drawing instruction from the image interface, such that each of the geometry processing means sends to the image interface an image transfer request containing the identification information of the drawing context acquired as a result of the geometry processing together with information indicative of a priority given to the image transfer request, and wherein the image interface receives the image transfer requests from the geometry processing means in the order of priority to sequentially apply the drawing instructions to the drawing processing means.

6. A data communication system as claimed in claim 1 wherein the new serial data include a plurality of pieces, and the auxiliary data identify which of the plurality of pieces have been altered.

7. A data communication system as claimed in claim 1 wherein the auxiliary data identify the position of the altered data.

8. A data communication system as claimed in claim 1 wherein the auxiliary data identify the type of the altered data.

9. A data communication system, comprising:
M first arbitrator means (where M is a natural number greater than one) each for arbitrating operations of corresponding N processing units (where N is a natural number greater than one), the N processing units cooperating to perform cooperative processing, wherein each of the M first arbitrator means includes a first register capable of storing at least data provided by the N processing units; and
second arbitrator means for arbitrating operations of the M first arbitrator means, the second arbitrator means including a second register capable of storing data provided from the M first arbitrator means, wherein data are stored in parallel in each of the registers and the data stored in each register are serially read out to form new serial data, such that when the new serial data include data that have been altered from serial data previously formed, auxiliary data for identifying which data have been altered are added to a predetermined portion of the new serial data read from at least the first register.

10. The system according to claim 9, wherein the processing units cooperate with one another to create frame image data with respect to divided images of a predetermined image.

11. The system according to claim 9, wherein
each of the processing units includes drawing processing means for drawing a predetermined image, a plurality of geometry processing means for independently performing geometry processing on the basis of predetermined image display instructions, and an image interface which intervenes between the drawing processing means and the geometry processing means, and
the drawing processing means includes a buffer for storing identification information together with a drawing context for each of the geometry processing means, and means for reading a specific drawing context from the buffer in response to a drawing instruction from the image interface, such that
each of the geometry processing means sends to the image interface an image transfer request containing the identification information of the drawing context acquired as a result of the geometry processing together with information indicative of a priority given to the image transfer request, and
the image interface receives the image transfer requests from the geometry processing means in the order of priority to sequentially apply the drawing instructions to the drawing processing means.

12. A data communication system as claimed in claim 9 wherein the new serial data include a plurality of pieces, and the auxiliary data identify which of the plurality of pieces have been altered.

13. A data communication system, comprising:
M first arbitrator means (where M is a natural number greater than one) each for arbitrating operations of corresponding N processing units (where N is a natural number greater than one), the N processing units cooperating to perform cooperative processing, wherein each of the M first arbitrator means includes a first register capable of storing data provided by each of the N processing units; and
second arbitrator means for arbitrating operations of the M first arbitrator means, the second arbitrator means including a second register capable of storing data of a predetermined size for application to each of the M first arbitrator means, wherein
copies of the data stored in the second register are propagated over all the processing units at the same time through the first registers.

14. The system according to claim 13, wherein the processing units cooperate with one another to create frame image data with respect to divided images of a predetermined image.

15. The system according to claim 13, wherein
each of the processing units includes drawing processing means for drawing a predetermined image, a plurality of geometry processing means for independently performing geometry processing on the basis of predetermined image display instructions, and an image interface which intervenes between the drawing processing means and the geometry processing means, and
the drawing processing means includes a buffer for storing identification information together with a drawing context for each of the geometry processing means, and means for reading a specific drawing context from the buffer in response to a drawing instruction from the image interface, such that
each of the geometry processing means sends to the image interface an image transfer request containing the identification information of the drawing context acquired as a result of the geometry processing together with information indicative of a priority given to the image transfer request, and
the image interface receives the image transfer requests from the geometry processing means in the order of priority to sequentially apply the drawing instructions to the drawing processing means.

16. A data communication system which controls storing of data into and reading of data from a register provided on a computer network, the register provided for storing data to be exchanged between the register and a plurality of processing units for cooperative processing through the computer network, the system comprising:
first means for storing data from one of the processing units in parallel in the register; and
second means for serially reading the data from the register to form new serial data, and which, when the new serial data contain data that have been altered from serial data previously formed, adds auxiliary data for identifying the altered data to a predetermined portion of the new serial data, and for sending the new serial data to one of the other processing units through the computer network.

17. A data communication system as claimed in claim 16 wherein the new serial data include a plurality of pieces, and the auxiliary data identify which of the plurality of pieces have been altered.

18. A data communication method for carrying out data communications between a plurality of processing units for cooperative processing and a subsequent-stage processing unit, the method comprising the steps of:

storing data, output from the processing units, in parallel in a first predetermined register;

serially reading the stored data from the first register to form new serial data;

when the new serial data contain data that have been altered from serial data previously formed, adding auxiliary data for identifying the altered data to a predetermined portion of the new serial data;

sending the new serial data to the subsequent-stage processing unit;

storing data from the subsequent-stage processing unit in parallel in a second predetermined register; and propagating copies of the parallel data stored in the second register over all the plurality of processing units at the same time.

19. The method according to claim 18, wherein the new serial data are formed at a time that the data from the plurality of processing units stored in parallel in the first register have been altered from the serial data previously formed.

20. The method according to claim 18, wherein the processing units and the subsequent-stage processing unit are computers having communication capabilities, the first register is provided in any one of the computers, and all the processing units are connected to a computer network so that data are exchanged through the computer network.

21. A data communication method as claimed in claim 18 wherein the new serial data include a plurality of pieces, and the auxiliary data identify which of the plurality of pieces have been altered.

22. A computer-readable medium recorded with a set of computer-executable instructions for causing a computer to control storing of data into and reading of data from a register provided on a computer network, the register provided for storing data to be exchanged with other computers for cooperative processing through the computer network, the set of instructions for controlling the computer for:

storing data from the computer in parallel in the register;

serially reading the data from the register to form new serial data;

when the new serial data contain data that have been altered from serial data previously formed, adding auxiliary data for identifying the altered data to a predetermined portion of the new serial data; and sending the new serial data to one of the other computers through the computer network.

23. A computer-readable medium as claimed in claim 22 wherein the new serial data include a plurality of pieces, and the auxiliary data identify which of the plurality of pieces have been altered.

24. A data communication system, comprising:

a register;

a number of information processing units for providing data in parallel to the register for storage therein; and a processor coupled to the register for receiving serial data therefrom, the serial data including the stored data in the register;

wherein the received serial data further includes auxiliary data when the stored data have changed from data previously stored in the register, the auxiliary data identifying the changed data.

25. A data communication system as claimed in claim 24, wherein the received serial data include a plurality of pieces, and the auxiliary data identify which of the plurality of pieces have changed.

26. A data communication system, comprising:

an image processing unit including a register and a number of information processing units, wherein the number of information processing units provide data in parallel to the register for storage therein; and a processor coupled to the image processing unit for receiving serial data therefrom, the serial data including the stored data in the register;

wherein the information processing unit includes auxiliary data in the serial data when the stored data have changed from data previously stored in the register, the auxiliary data identifying the changed data.

27. The data communication system of claim 26, wherein each information processing unit comprises:

a drawing processor for drawing a predetermined image;

a plurality of geometry processors for independently performing geometry processing on the basis of predetermined image display instructions; and an image interface for coupling the drawing processor and the plurality of geometry processors;

wherein the drawing processor includes a buffer for storing identification information together with a drawing context for each of the geometry processors, the drawing processor reading a specific drawing context from the buffer in response to a drawing instruction from the image interface;

each of the geometry processors sends to the image interface an image transfer request including identification information of a drawing context acquired as a result of the geometry processing together with information indicative of a priority given to the image transfer request; and the image interface receives the image transfer requests from the geometry processors in the order of priority to sequentially apply the drawing instructions to the drawing processor.

28. The data communication system of claim 27, wherein the data provided in parallel to the register of the image processing unit represents frame image data created by each of the number of information processing units.

29. A data communication system as claimed in claim 26, wherein the received serial data include a plurality of pieces, and the auxiliary data identify which of the plurality of pieces have changed.

30. A data communication system comprising:

a unitary register for storing data which are exchanged between the register and a plurality of processing units for cooperative processing; and a control means for controlling the register for (a) storing data output from each of the plurality of processing units in parallel together in the register, and (b) reading the data from the register to form new serial data, wherein the control means adds auxiliary data to a predetermined portion of the new serial data when the new serial data include data that have been altered from serial data previously formed, the auxiliary data identifying the altered data, and wherein the control means provides the new serial data to a subsequent-stage processing unit with the auxiliary data added thereto.

* * * * *

UNITED STATES PATENT AND TRADEMARK OFFICE
CERTIFICATE OF CORRECTION

PATENT NO. : 6,952,213 B2
DATED : October 4, 2005
INVENTOR(S) : Hitoshi Ebihara

It is certified that error appears in the above-identified patent and that said Letters Patent is hereby corrected as shown below:

<u>Column 15,</u>
Line 62, "includes" should read -- include --.

<u>Column 16,</u>
Line 45, "represents" should read -- represent --.

Signed and Sealed this

Seventh Day of February, 2006

JON W. DUDAS
*Director of the United States Patent and Trademark Office*